United States Patent
Itoh et al.

(10) Patent No.: US 7,298,605 B2
(45) Date of Patent: Nov. 20, 2007

(54) ELECTROLYTIC CAPACITOR

(75) Inventors: Masayuki Itoh, Kawasaki (JP);
Kiyokazu Moriizumi, Kawasaki (JP);
Takao Ishikawa, Kawasaki (JP);
Tomokazu Nakashima, Kawasaki (JP);
Masako Okazaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/234,161

(22) Filed: Sep. 26, 2005

(65) Prior Publication Data

US 2006/0285275 A1 Dec. 21, 2006

(30) Foreign Application Priority Data

Jun. 21, 2005 (JP) ............... 2005-180719

(51) Int. Cl.
*H01G 2/10* (2006.01)
*H01G 9/08* (2006.01)

(52) U.S. Cl. .................. 361/517; 361/535

(58) Field of Classification Search ........ 361/511–513, 361/517–521, 530, 535–538; 29/25.03; 427/79
See application file for complete search history.

(56) References Cited

U.S. PATENT DOCUMENTS

| | | | |
|---|---|---|---|
| 4,190,682 A * | 2/1980 | Shaw | 427/79 |
| 4,381,535 A * | 4/1983 | Shedigian et al. | 361/318 |
| 4,388,669 A * | 6/1983 | Cichanowski | 361/319 |
| 4,760,494 A | 7/1988 | Crum | |
| 5,348,922 A * | 9/1994 | Kuma | 502/60 |
| 5,445,856 A | 8/1995 | Chaloner-Gill | |
| 6,017,367 A | 1/2000 | Nakata | |
| 6,735,074 B2 * | 5/2004 | Nakamura et al. | 361/520 |
| 2002/0139553 A1 | 10/2002 | Minato et al. | |
| 2006/0061938 A1 * | 3/2006 | Dombro et al. | 361/502 |

FOREIGN PATENT DOCUMENTS

| | | |
|---|---|---|
| GB | 2 057 190 A | 3/1981 |
| JP | 03-161918 | 7/1991 |
| JP | 09-092584 | 4/1997 |
| JP | 09092584 A * | 4/1997 |
| JP | 09097742 A * | 4/1997 |
| JP | 11-310509 | 11/1999 |
| JP | 2000-030980 A | 1/2000 |
| JP | 2000-286170 | 10/2000 |
| JP | 2001-015393 | 1/2001 |
| JP | 2003-282363 A | 10/2003 |
| WO | 01/16971 A1 | 3/2001 |
| WO | WO-01/16971 A1 | 3/2001 |

* cited by examiner

*Primary Examiner*—Eric Thomas
(74) *Attorney, Agent, or Firm*—Arent Fox LLP

(57) ABSTRACT

The present invention provides a low-cost electrolytic capacitor wherein the deformation of the casing due to the thermal expansion during reflowing is prevented. An electrolytic capacitor of a surface mounting type having a capacitor element that consists of a dielectric film and an electrode foil, a metal casing that holds the capacitor element, and an electrolyte solution in which the capacitor element held in the casing is immersed, wherein the casing is equipped with a gas absorbing member that absorbs the gas generated in the casing.

3 Claims, 3 Drawing Sheets

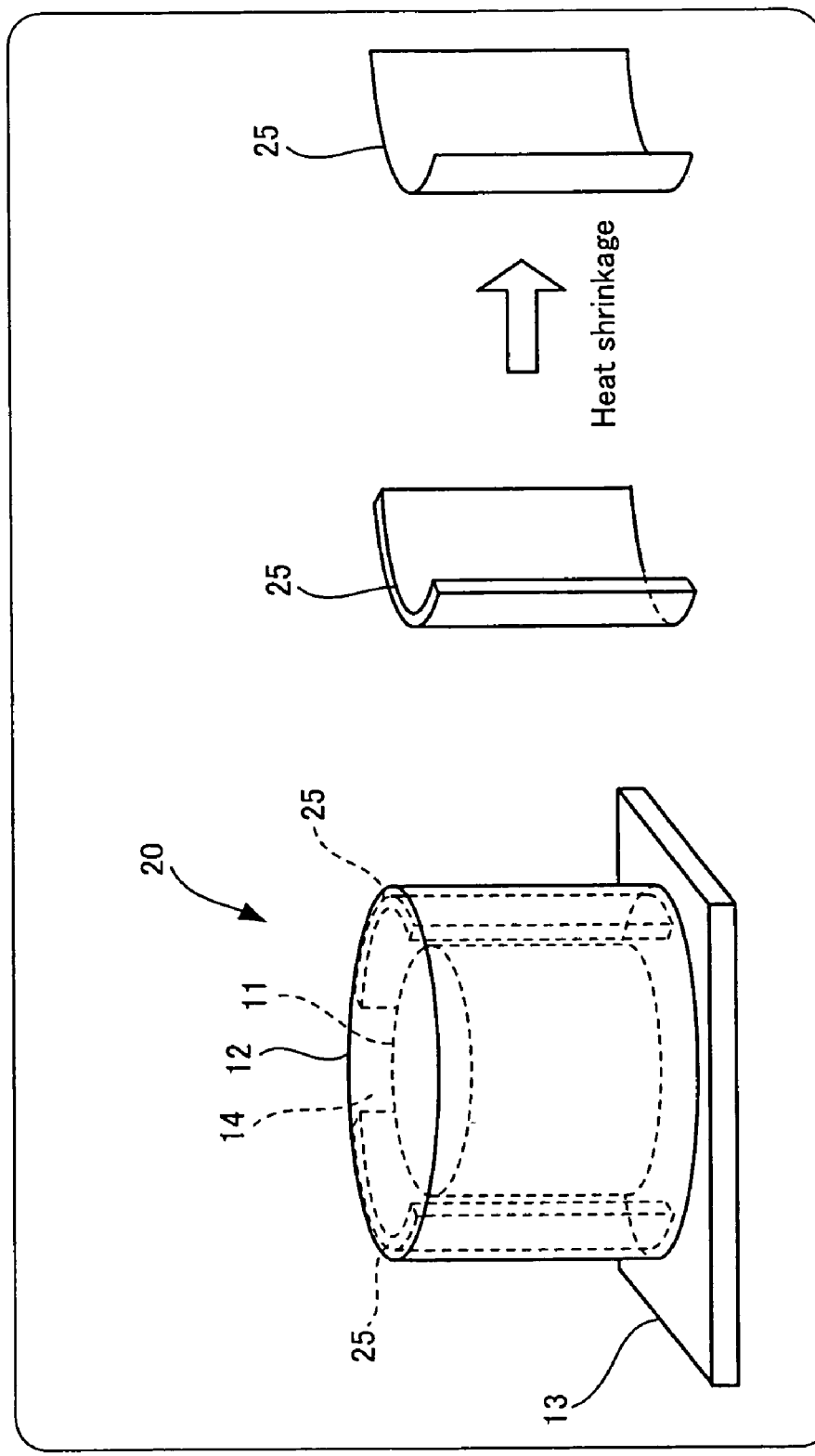

ELECTROLYTIC CAPACITOR

BACKGROUND OF THE INVENTION

1. Field of the Invention

The present invention relates to an electrolytic capacitor of a surface mounting type.

2. Description of the Related Art

Heretofore, an electrolytic capacitor having a capacitor element, a casing made of a metal such as aluminum that holds the capacitor element, and an electrolyte solution in which the capacitor element held in the casing has been widely used.

Although electrolytic capacitors include an SMD (surface mounted device) mounted on a substrate by reflowing, and an IMD (insert-molded device) mounted on a substrate by printing, the present invention relates to an SMD-type electrolytic capacitor.

In the SMD-type electrolytic capacitor, a paste-like solder known as "cream solder" is previously printed on a substrate so as to enable surface mounting, an SMD is mounted on the surface of the substrate using an injecting molding machine known as a chip mounter, and thereafter, the substrate is heated to about 250° C. in a high-temperature furnace to melt the solder, and the SMD is adhered on the substrate.

In such an electrolytic capacitor, although the casing must be sealed so that the electrolyte solution and water vapor do not leak out of the casing, there may be a case wherein the internal pressure of the casing is elevated by the gas generated by heating during reflowing to expand the casing and to deform the SMD, and defect wherein the electrolytic capacitor cannot be properly mounted occurs.

Recently, on the other hand, the regulations on environmental contaminants have become increasingly strict, and as part of it, the movement to regulate six chemical substances, such as lead, mercury, cadmium and hexavalent chromium covering electrical and electronic equipment (RoHS Directive) is spreading across the world. The RoHS Directive prohibits the use of the six substances in the products marketed in EU member nations from July 2006, and the industry is required to respond to the RoHS regulations.

Lead, which is specified in the RoHS regulations as a hazardous substance, is contained in lead solder widely used for a long time in the reflow step for an electrolytic capacitor, and since the possibility of the elution of lead from lead-containing waste due to acid rain or the like has been pointed out, switching to unleaded solder has been desired. However, since the melting temperature of most unleaded solders presently considered is higher than before, there is no choice other than raising the reflow temperature. Therefore, the quantity of gas generated in the casing due to the rise of heating temperature during the reflow of an electrolytic capacitor tends to increase than before. Heretofore, for these problems, although the approach to seal the generated gas in the casing has been tried, there is limitation in such countermeasures.

Therefore, as an electrolytic capacitor having a structure that lets off the air out of the casing, but does not let off the electrolyte solution and water vapor in the casing, there has been disclosed an electrolytic capacitor wherein a capacitor element is held in a casing consisting of a composite resin of a phenol resin and alumina, and equipped with a gas transmitting section having fine pores each having a diameter of 0.01 to 2 μm (for example, refer to Japanese Patent Laid-Open No. 2000-286170, pp. 2-3, FIGS. 1 and 2).

However, since the electrolytic capacitor disclosed in the above reference must use a casing equipped with a gas transmitting section of a special structure, there is a problem of higher costs. In addition, there is possibility of causing environmental contamination by the gas released from the gas transmitting section.

SUMMARY OF THE INVENTION

The present invention has been made in view of the above circumstances and provides an electrolytic capacitor wherein the deformation of the casing due to thermal expansion during reflow is prevented at low costs.

A first electrolytic capacitor of the present invention that solves the above problems is an electrolytic capacitor of a surface mounting type including: a capacitor element that includes a dielectric film and an electrode foil; a metal casing that holds the capacitor element; and an electrolyte solution in which the capacitor element held in the casing is immersed, wherein the casing is equipped with a gas absorbing member that absorbs the gas generated in the casing.

According to the first electrolytic capacitor of the present invention, by equipping the casing with a gas absorbing member that absorbs gas, even if gas is generated in the casing by heating, the gas is absorbed by the gas absorbing member, and the deformation of the casing due to thermal expansion can be prevented.

Here, the gas absorbing member can be either activated charcoal or zeolite.

A second electrolytic capacitor of the present invention that solves the above problems is an electrolytic capacitor of a surface mounting type including: a capacitor element that includes a dielectric film and an electrode foil; a metal casing that holds the capacitor element; and an electrolyte solution in which the capacitor element held in the casing is immersed, wherein the casing is equipped with a heat shrinkable member that shrinks by heating.

According to the second electrolytic capacitor of the present invention, by equipping the casing with a heat shrinkable member that shrinks by heating, even if gas is generated in the casing by heating, the gas is kept in a space formed by the shrinkage of the heat shrinkable member, and the deformation of the casing due to thermal expansion can be prevented.

According to the electrolytic capacitor of the present invention, as described above, a low-cost electrolytic capacitor, wherein the deformation of the casing due to thermal expansion is prevented, can be realized.

BRIEF DESCRIPTION OF THE DRAWINGS

FIG. 3 is a schematic diagram that shows the state after the reflow of an electrolytic capacitor according to the second embodiment.

DETAILED DESCRIPTION OF THE INVENTION

Figure 1:
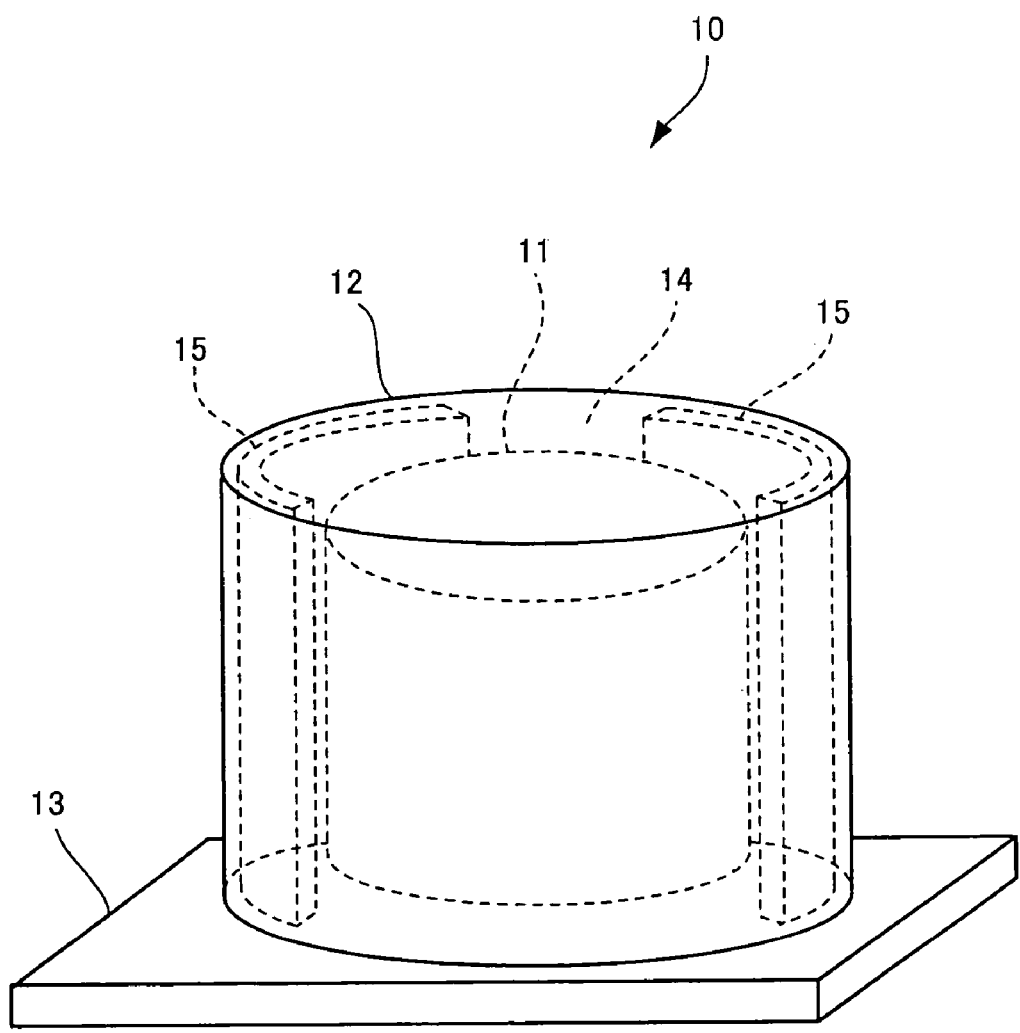
FIG. 1 is a schematic diagram that shows the state before the reflow of an electrolytic capacitor according to the first embodiment.

The embodiments of electrolytic capacitors according to the present invention will be described below referring to the drawings.

First, the first embodiment of the present invention will be described.

The first embodiment relates to a first electrolytic capacitor of the present invention.

FIG. 1 is a schematic diagram that shows the state before the reflow of an electrolytic capacitor according to the first embodiment.

As FIG. 1 shows, the electrolytic capacitor 10 is a surface-mounting type electrolytic capacitor that has a columnar capacitor element 11 consisting of a dielectric film (not shown) and an electrode foil (not shown), a hollow cylindrical aluminum casing 12 that holds the capacitor element 11, a base 13 to place the casing 12, and an electrolyte solution 14 in which the capacitor element 11 held in the casing 12 is immersed. The casing 12 is equipped with gas absorbing members 15 that absorb gas generated in the casing 12.

The gas absorbing member 15 has a shape as if a hollow cylinder surrounding the circumference of the capacitor element 11 is cut in the height direction as shown in FIG. 1.

Although any material can be used as the gas absorbing member 15 as long as the material absorbs gases generated when the capacitor element is heated, it is especially preferable to form the gas absorbing member 15 from activated charcoal or zeolite, and silica gel or alumina can also be used.

A lead pin (not shown) is drawn downward out of the electrode foil of the capacitor element 11, and a solder material is previously adhered on the end portion of the lead pin. The electrolytic capacitor 10 is attached on the surface of a substrate using a chip mounter or the like, and mounted on the substrate by reflow treatment (solder melting treatment) in a high-temperature furnace.

Figure 2:
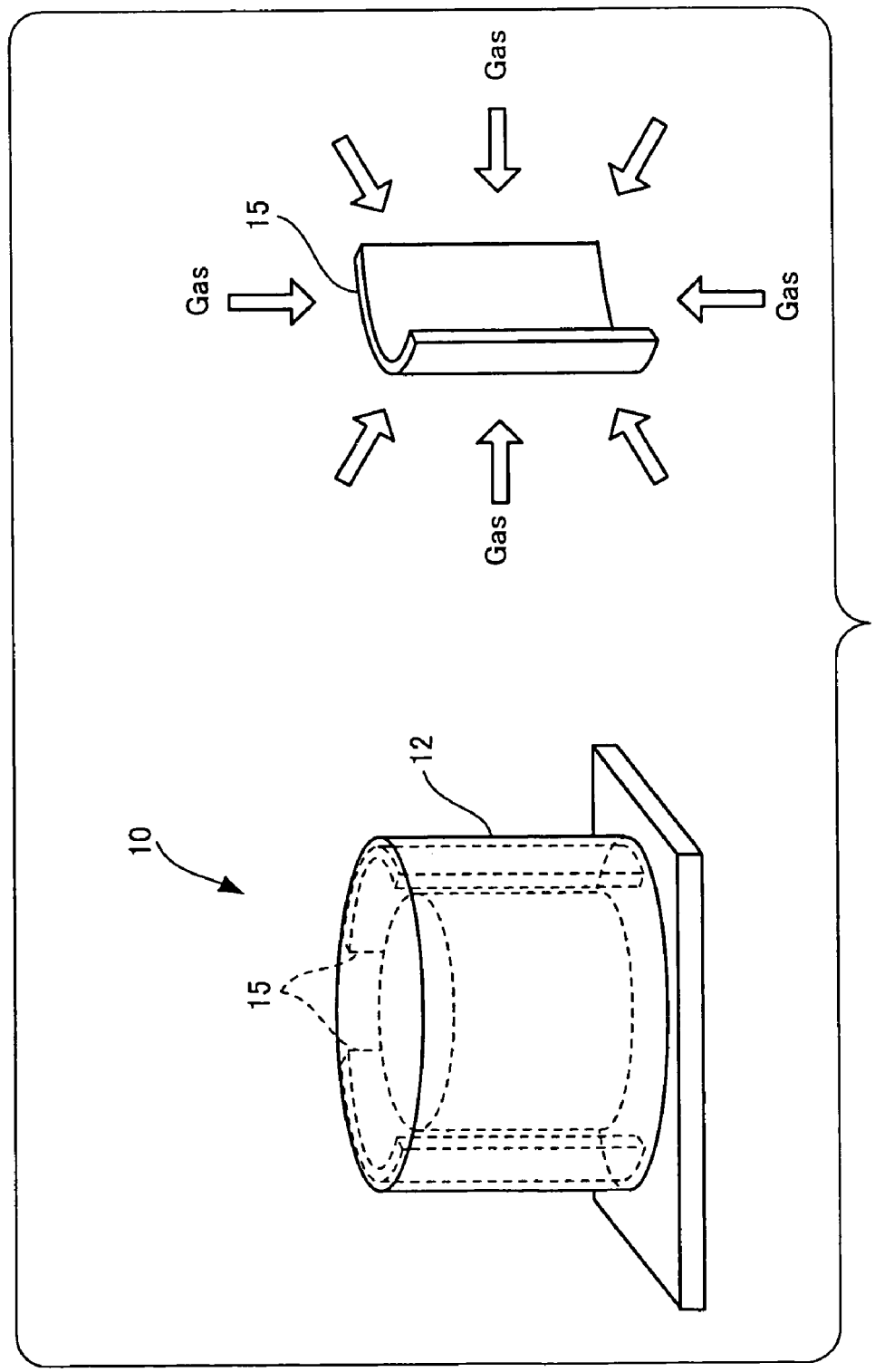
FIG. 2 is a schematic diagram that shows the state after the reflow of an electrolytic capacitor according to the first embodiment.

FIG. 2 is a schematic diagram that shows the state after the reflow of an electrolytic capacitor according to the first embodiment.

The electrolytic capacitor 10 shown in FIG. 1 is heated at a high temperature during the reflow treatment, and gas is generated from the contents in the casing. However, since the gas is absorbed in the gas absorbing members 15 in the electrolytic capacitor 10, the deformation of the casing 12 due to the gas generated during the reflow treatment can be prevented.

Next, the second embodiment of the present invention will be described.

The second embodiment relates to a second electrolytic capacitor of the present invention.

FIG. 3 is a schematic diagram that shows the state after the reflow of an electrolytic capacitor according to the second embodiment.

The electrolytic capacitor 20 of the second embodiment is a surface-mounting type electrolytic capacitor that has a columnar capacitor element 11 consisting of a dielectric film (not shown) and an electrode foil (not shown), a hollow cylindrical aluminum casing 12 that holds the capacitor element 11, a base 13 to place the casing 12, and an electrolyte solution 14 in which the capacitor element 11 held in the casing 12 is immersed similar to the electrolytic capacitor 10 of the first embodiment. However, it is different from the first embodiment in that the casing 12 is equipped with heat-shrinkable members 25 that shrink by heating in place of the gas absorbing members 15 in the first embodiment.

The heat-shrinkable member 25 has a shape as if a hollow cylinder surrounding the circumference of the capacitor element 11 is cut in the height direction as shown in FIG. 3.

Similar to the first embodiment, a lead pin (not shown) is drawn downward out of the electrode foil of the capacitor element 11, and a solder material is previously adhered on the end portion of the lead pin. The electrolytic capacitor 20 is attached on the surface of a substrate using a chip mounter or the like, and mounted on the substrate by reflow treatment (solder melting treatment) in a high-temperature furnace.

The electrolytic capacitor 20 is heated at a high temperature during the reflow treatment, and gas is generated from the contents in the casing. However, since the heat-shrinkable member 25 produces a space equivalent to volume increase due to the thermal expansion of the contents of the casing, the gas generated during the reflow treatment is held in the space; therefore, the deformation of the casing 12 can be prevented.

As the heat-shrinkable member 25, any heat-shrinkable materials, such as polyolefins, neoprene, fluoroplastic Teflon (trademark), fluoroplastic Kynar, polytetrafluoroethylene, polyvinylidene fluoride, ethylene-propylene, polyvinyl chloride, fluorocarbon resins, polyimide, Teflon (trademark), and silicone rubber, can be used.

What is claimed is:

1. An electrolytic capacitor of a surface mounting type comprising: a capacitor element that includes a dielectric film and an electrode foil, a metal casing that holds the capacitor element, and an electrolyte solution in which the capacitor element held in the casing is immersed, wherein:
the casing is equipped with a gas absorbing member that absorbs the gas generated in the casing, and the gas absorbing member is activated charcoal.

2. An electrolytic capacitor of a surface mounting type comprising: a capacitor element that includes a dielectric film and an electrode foil, a metal casing that holds the capacitor element, and an electrolyte solution in which the capacitor element held in the casing is immersed, wherein:
the casing is equipped with a gas absorbing member that absorbs the gas generated in the casing, and the gas absorbing member is zeolite.

3. An electrolytic capacitor of a surface mounting type comprising: a capacitor element that includes a dielectric film and an electrode foil, a metal casing that holds the capacitor element, and an electrolyte solution in which the capacitor element held in the casing is immersed, wherein:
the casing is equipped with a heat shrinkable member that shrinks by heating, the heat shrinkable member being provided within the casing.

* * * * *